(12) United States Patent
Sinclair

(10) Patent No.: US 6,481,097 B1
(45) Date of Patent: Nov. 19, 2002

(54) INSERTION TOOL

(75) Inventor: John Ashton Sinclair, Wingham New South Wales (AU)

(73) Assignee: Pupbest Pty Ltd., New South Wales (AU)

(*) Notice: Subject to any disclaimer, the term of this patent is extended or adjusted under 35 U.S.C. 154(b) by 0 days.

(21) Appl. No.: 09/744,507
(22) PCT Filed: May 25, 2000
(86) PCT No.: PCT/AU00/00552
§ 371 (c)(1),
(2), (4) Date: Mar. 21, 2001
(87) PCT Pub. No.: WO00/72418
PCT Pub. Date: Nov. 30, 2000

(30) Foreign Application Priority Data

May 25, 1999 (AU) .............................................. PQ0550

(51) Int. Cl.$^7$ .............................. H02G 1/06; H02G 5/04; H01R 43/22
(52) U.S. Cl. .............................. 29/745; 29/757; 29/758; 29/759; 29/760; 29/33 F; 29/34 D; 81/488
(58) Field of Search .......................... 29/745, 747, 748, 29/749, 750, 752, 754, 755, 757, 758, 272, 868, 33 F, 34 D, 728, 759, 760; 81/488

(56) References Cited

U.S. PATENT DOCUMENTS

| 1,496,239 | A | * | 6/1924 | Lynch |
| 2,761,199 | A | * | 9/1956 | Allen |
| 3,160,394 | A | * | 12/1964 | Hunter et al. |
| 3,891,013 | A | * | 6/1975 | Folk et al. |
| 4,308,659 | A | * | 1/1982 | Bradewie et al. |
| 4,681,169 | A | * | 7/1987 | Brookbank, III |
| 5,265,326 | A | * | 11/1993 | Scribner |
| 6,055,789 | A | * | 5/2000 | Zimmerman |
| 6,317,968 | B1 | * | 11/2001 | Kawamura |

FOREIGN PATENT DOCUMENTS

| WO | 9612327 | 4/1996 |
| WO | 9811634 | 3/1998 |

* cited by examiner

Primary Examiner—David P. Bryant
Assistant Examiner—Eric Compton
(74) Attorney, Agent, or Firm—Ladas & Parry

(57) ABSTRACT

A tool (1) to insert a plurality of elongated flexible electric conductors (4) into the slots (3) of an elongated flexible insulating housing (2). The tool (1) has a passage (13) through which the housing (2) and conductors (4) move to have the conductors (4) urged into the slot (3). The passage (13) is bordered by a plurality of ramps (10) which engages the conductors (4) to urge them into the slot (3).

4 Claims, 8 Drawing Sheets

INSERTION TOOL

TECHNICAL FIELD

The present invention relates to a tool to insert an electrical conductor into a housing, and more particularly but not exclusively, to insert simultaneously three conductors into three corresponding extending slots in an electrical housing.

1. Background of the Invention

International patent applications such as PCT/AU97/00589 and PCT/AU95/00675 disclose elongated flexible insulators which house a number of elongated flexible conductors. Difficulty has been experienced in assembling the conductors in the insulator.

It would therefore be desirable to provide a device that could quickly, cheaply and easily insert one or more electrical conductors simultaneously into an electrical housing.

2. Object of the Invention

It is an object of the present invention to overcome or ameliorate some of the disadvantages of the prior art, or at least to provide a useful alternative.

SUMMARY OF THE INVENTION

There is disclosed herein a tool to insert elongated flexible conductors into an elongated housing.

the housing providing a plurality of longitudinally extending slots at least one of which is to receive one of the conductors, said tool including:
   a body having a passage through which the housing and each conductor passes during insertion of each conductor in an associated slot of the housing;
   guide means mounted on the body and positioned to slidably engage and support the housing so that the housing is restrained to move along a predetermined path in the body; and
   said guide means including at least one insertion means to slidably engage one of the conductors to apply a force thereto to force said one conductor into the associated slot.

Preferably, said insertion means are in the form of ramps along which said conductors slide.

Preferably, said housing includes three longitudinally extending slots.

BRIEF DESCRIPTION OF THE DRAWINGS

A preferred form of the present invention will now be described by way of example only with reference to the accompanying drawings wherein.

DETAILED DESCRIPTION OF THE PREFERRED EMBODIMENTS

Figure 1:
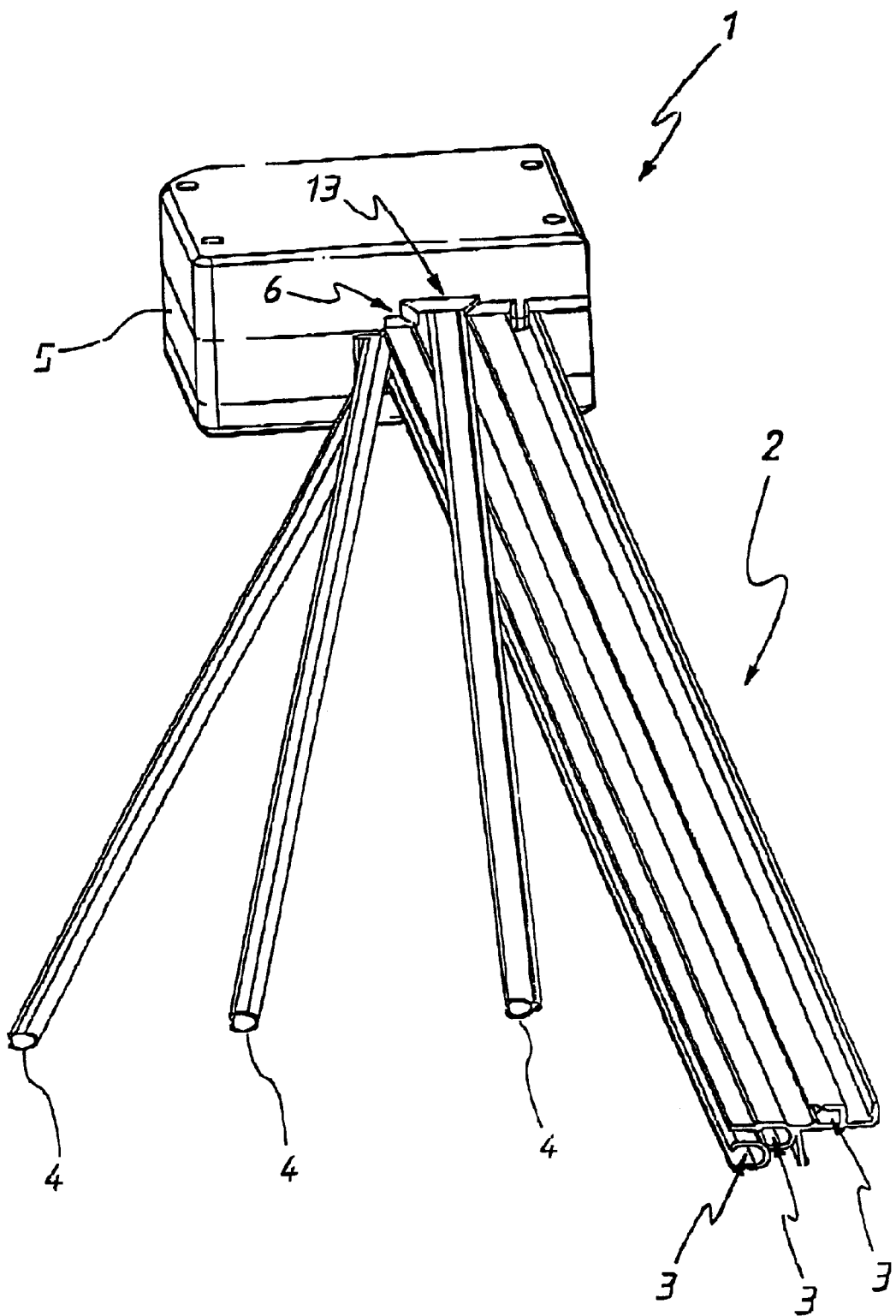
FIG. 1 is a schematic perspective view of the tool in situ.

In the accompanying drawings, and in particular reference to FIG. 1, there is schematically depicted a tool 1 having a passage 13 which receives an elongated flexible insulating housing 2 provided with a plurality of longitudinally extending slots 3. Each of the slots 3 being adapted to receive a flexible elongated electrical conductor 4. The tool 1 includes a body 5 providing the passage 13 through which the housing 2 and each conductor 4 passes during insertion of each conductor 4 into an associated slot 3 of the housing 2.

Guide means 6 is mounted in the body 5 and is positioned to slidably engage the housing 2 to restrain the housing 2 to move relative to the housing 2 along a predetermined path through the body 5. Guide means 6 includes at least one insertion means 7. The guide means 6 slidably engages and supports the housing 2 as it moves past the insertion means 7 along the predetermined path, defined by the passage 13, that the insertion means 7 slidably engaging one of the conductors 4 to be inserted in one of the slots 3. Each slot 3 is adjacent a restrictive one of the insertion means 7 so that each of the conductors 4 is forced into an associated slot 3.

Figure 2:
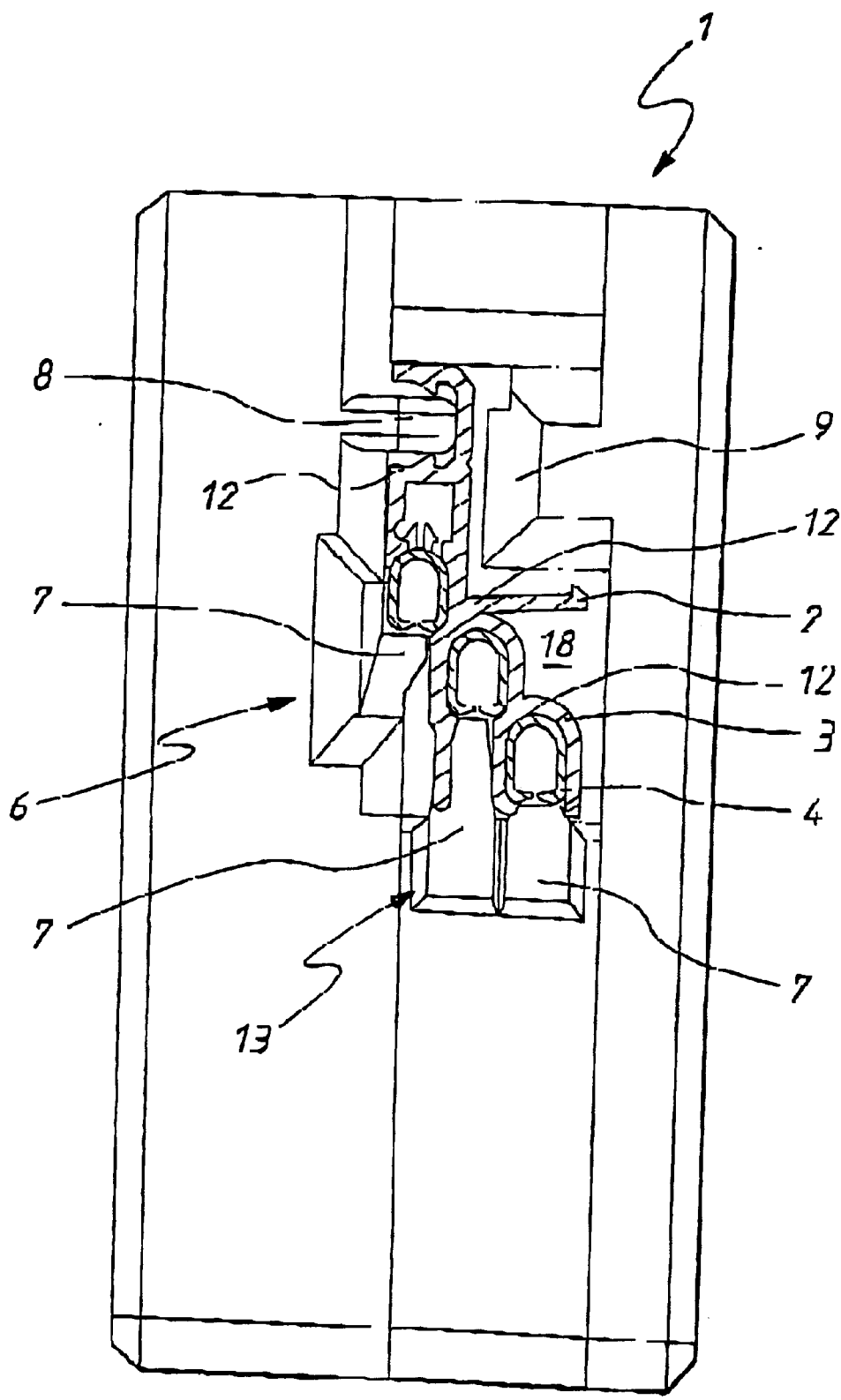
FIG. 2 is a schematic side elevation of the tool as shown in FIG. 1.

FIG. 2 shows an end view of the tool 1 during operation where three conductors 4 have been inserted into three corresponding slots 3 by respective insertion means 7. Guide means 6 is generally shown including guide flanges 8 and 9 which are adapted to support and guide the housing 2 through the body 5 of the tool 1.

Figure 3:
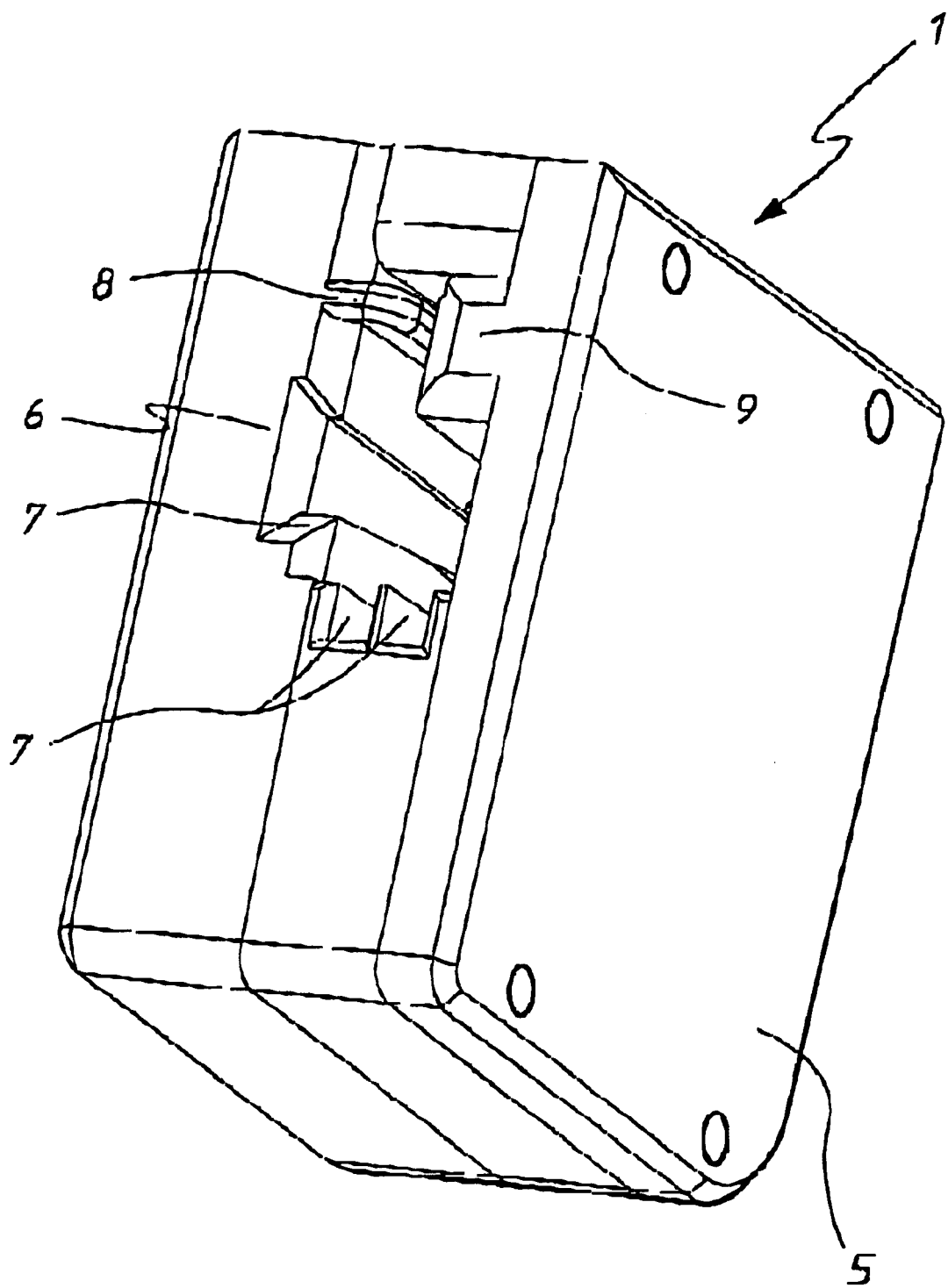
FIG. 3 is a schematic perspective view of the tool of FIG. 1.

FIG. 3 shows a perspective view of the tool 1 illustrated in FIG. 1 better showing the guide means 6 including the insertion means 7 and guide flanges 8 and 9.

Figure 4:
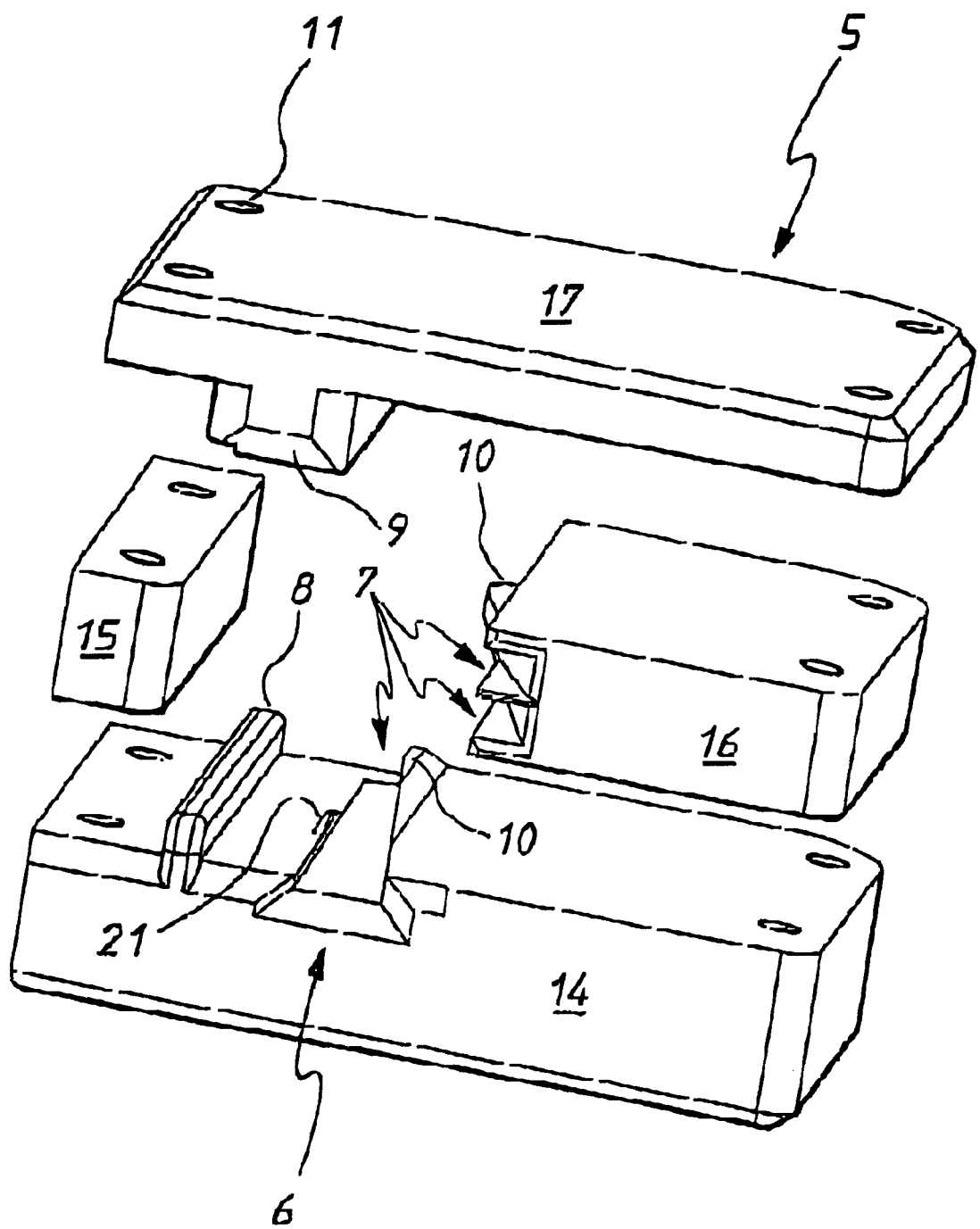
FIG. 4 is a schematic perspective parts exploded view of the tool of FIG. 1.
Figure 5:
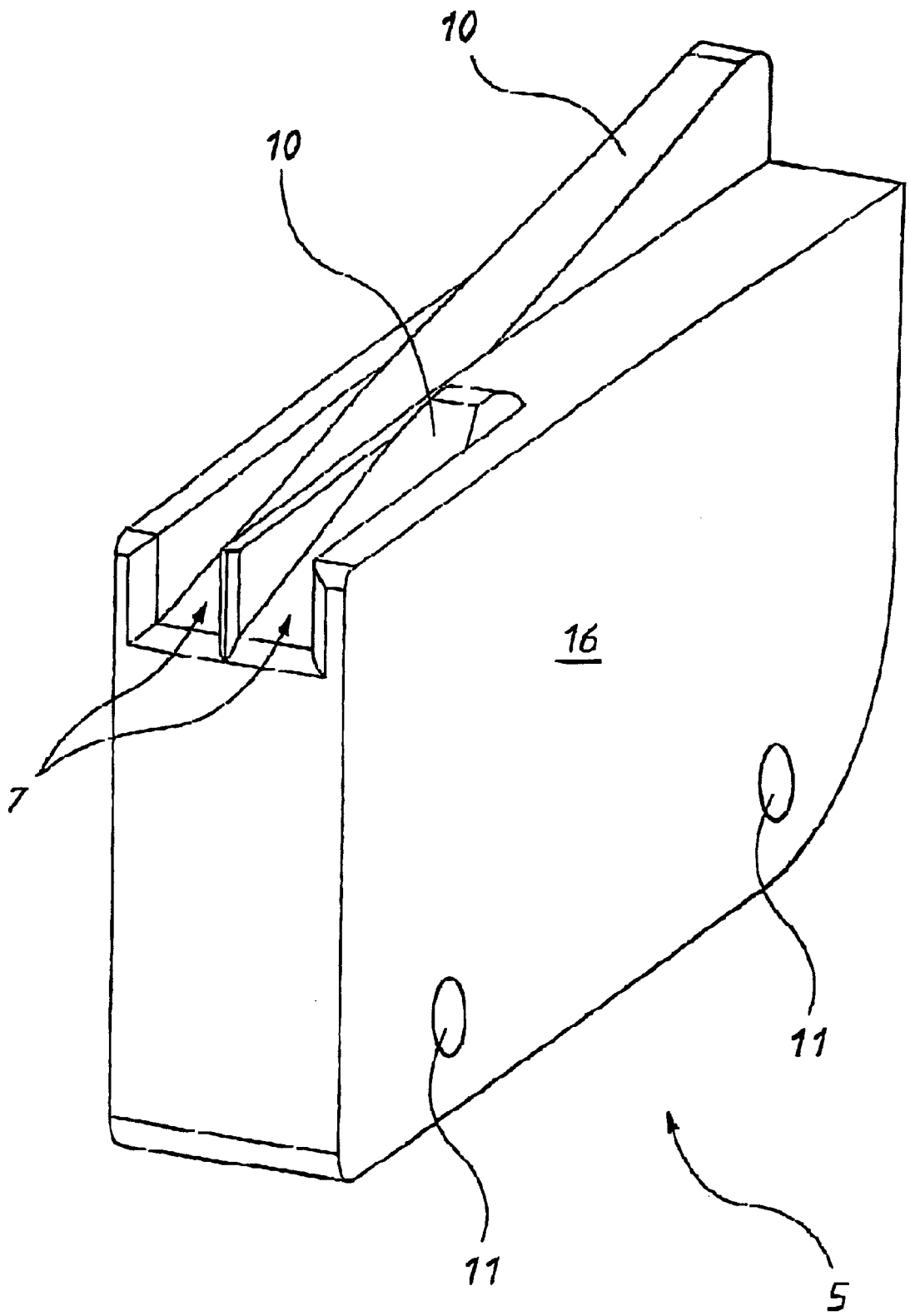
FIG. 5 is a schematic perspective view of one part of the tool of FIG. 1.
Figure 6:
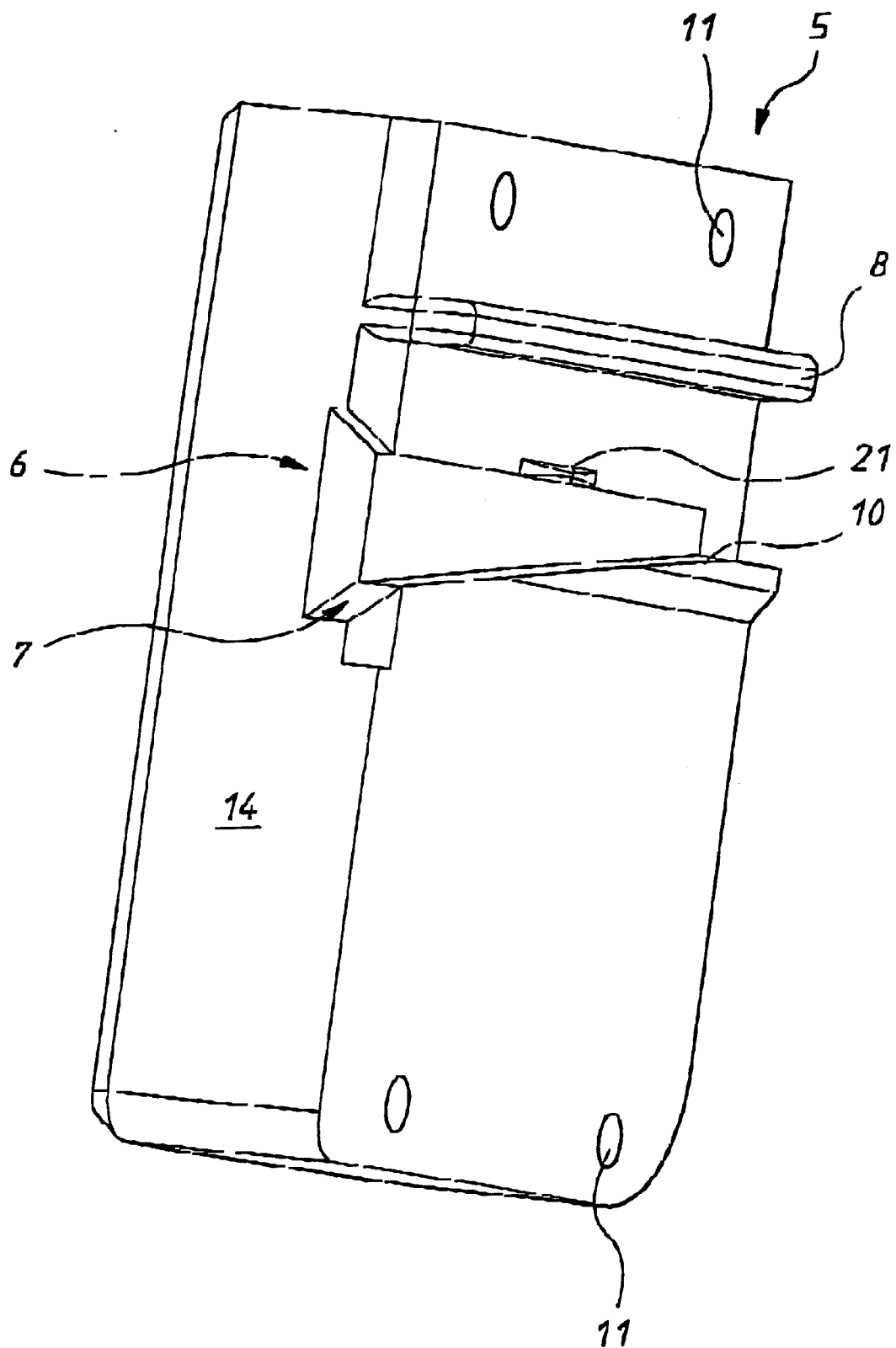
FIG. 6 is a schematic perspective view of another part of the tool of FIG. 1.
Figure 7:
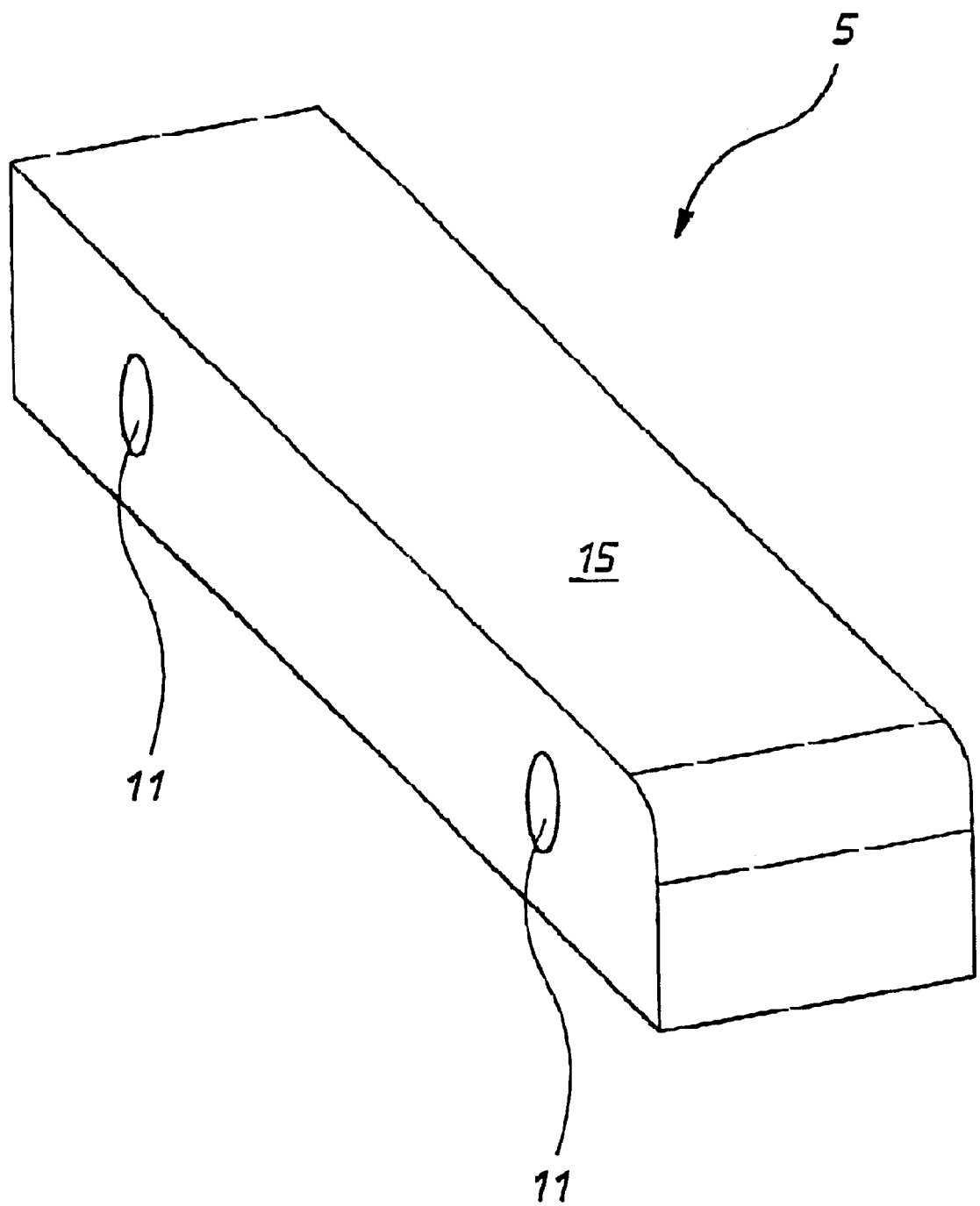
FIG. 7 is a schematic perspective view of another part of the tool of FIG. 1.
Figure 8:
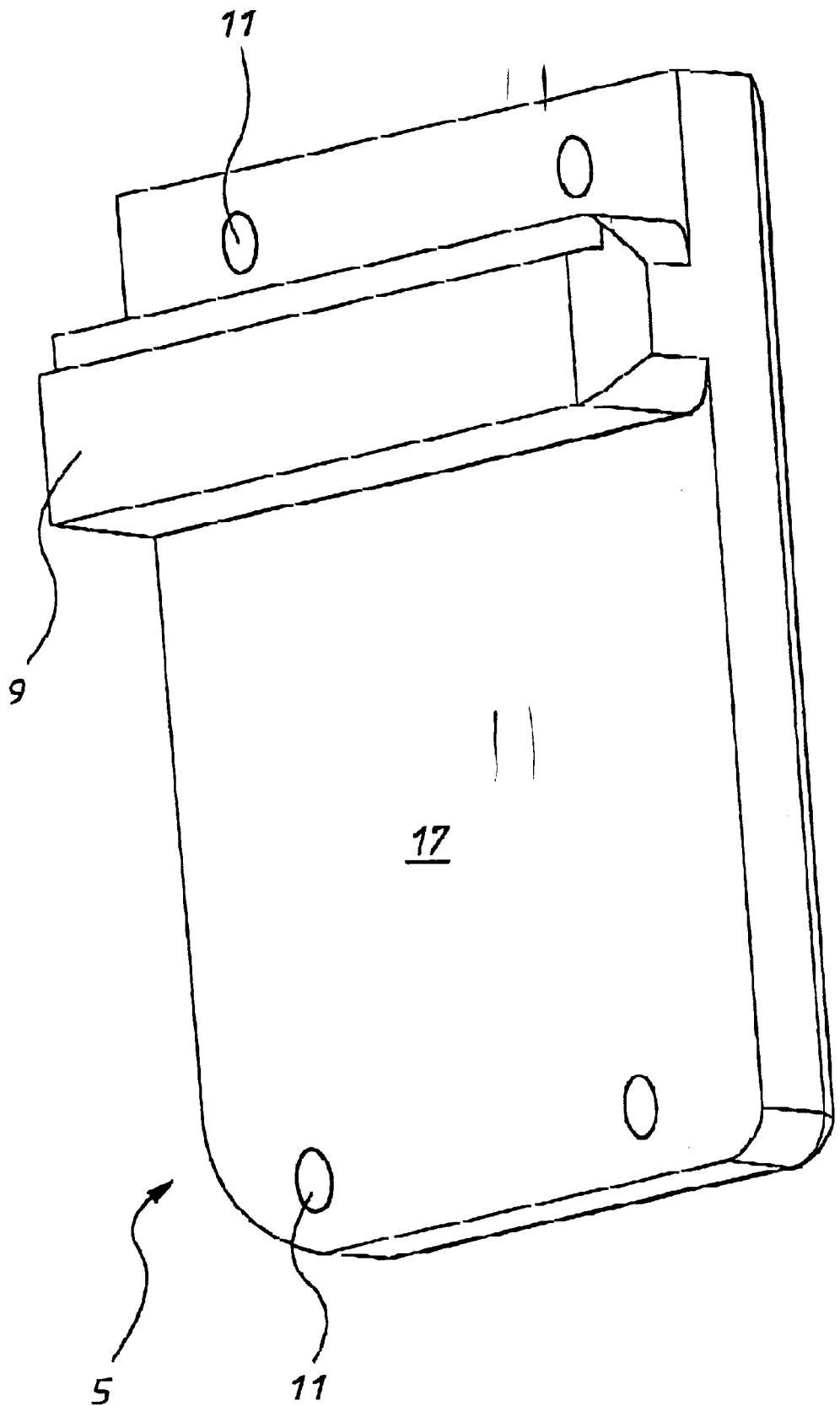
FIG. 8 is a schematic perspective view of another part of the tool of FIG. 1.

FIG. 4 illustrates a schematic perspective parts exploded view of the tool 1 of FIG. 1. In this particular case, the body 5 has been manufactured in four separate parts 14 to 17 which are assembled and secured together by threaded fasteners (not shown) which are inserted through holes 11. The body 5 may however be formed in one piece. In this exploded view of body 5, flanges 8 and 9 are more clearly shown whilst insertion means 7 now shows ramps 10 each of which when slidably engaged with one of the conductors 4 applies a force to the conductor 4 to force each conductor 4 into the associated slot 3 of the housing 2.

FIGS. 5 to 8 show individual perspective views of each of the parts of body 5 exploded in FIG. 4. These figures have been included to more clearly illustrate the guide means 6, flanges 8 and 9, insertion means 7 and ramps 10.

Each ramp 10 is inclined so that the space between the ramp 10 and opposing surfaces 12 of the body 5 reduces in the direction of movement of the housing 2 with respect to the body 5, so that the conductors 4 are urged into slots 3. The ramps extend generally in the direction of movement of the housing 2 through the body 5.

Part of the passage 13 is bordered by a support part 18 which slidably engages the housing 2 and provides opposing surfaces 12. The part 18 is configured to match the configuration of the housing 2.

Located on the part 14 and projecting into the passage 13 is a projection 21 which engages the adjacent conductor 4 to displace the conductor 4 to a position for insertion into the associated slot 3.

Although the invention has been described with reference to specific examples, it will be appreciated by those skilled in the art that the invention may be embodied in many other forms.

The claims defining the invention are as follows:

1. A tool to insert elongated flexible conductors into an elongated housing, the housing providing a plurality of longitudinally extending slots at least one of which is to receive one of the conductors, said tool including:

a body having a passage through which the housing and each conductor passes during insertion of each conductor in an associated slot of the housing;

guide means mounted on the body and positioned to slidably engage and support the housing so that the housing is restrained to move along a predetermined path in the body; and said guide means including at least one insertion means to slidably engage one of the conductors to apply a force thereto to force said one conductor into the associated slot.

2. The tool of claim 1 wherein the insertion means are ramps extending generally in the direction of said path but are inclined so that the space between the ramps and opposing surfaces of the body diminishes in the direction of movement of the housing through the body to thereby urge the conductors into the slots.

3. The tool of claim 1 wherein the tool is an assembly of a plurality of parts including a support part providing said reaction surfaces, which support part is of a configuration matching the configuration of the housing.

4. The tool of claim 2, wherein the tool is an assembly of a plurality of parts including a support part providing said reaction surfaces, which support part is of a configuration matching the configuration of the housing.

* * * * *